(12) United States Patent
Maslar

(10) Patent No.: US 11,712,758 B2
(45) Date of Patent: Aug. 1, 2023

(54) AUTOMATED INSPECTION AND VERIFICATION OF ELECTRIC MOTOR WELD QUALITY

(71) Applicant: Ford Global Technologies, LLC, Dearborn, MI (US)

(72) Inventor: Francis Maslar, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 342 days.

(21) Appl. No.: 17/078,758

(22) Filed: Oct. 23, 2020

(65) Prior Publication Data

US 2022/0126405 A1    Apr. 28, 2022

(51) Int. Cl.
| | |
|---|---|
| *B23K 31/12* | (2006.01) |
| *G06T 7/00* | (2017.01) |
| *B23K 26/03* | (2006.01) |
| *B23K 101/36* | (2006.01) |

(52) U.S. Cl.
CPC .......... *B23K 31/125* (2013.01); *B23K 26/032* (2013.01); *G06T 7/0004* (2013.01); *B23K 2101/36* (2018.08); *G06T 2207/20084* (2013.01); *G06T 2207/30152* (2013.01)

(58) Field of Classification Search
CPC ...... B23K 9/0953; B23K 9/095; G06B 19/24; G09B 9/00; G02B 7/04; G03B 17/561; H04N 23/55; H04N 23/00
See application file for complete search history.

(56) References Cited

U.S. PATENT DOCUMENTS

| | | | |
|---|---|---|---|
| 5,283,418 A | 2/1994 | Bellows et al. | |
| 5,602,885 A | 2/1997 | Ahmed et al. | |
| 6,948,369 B2* | 9/2005 | Fleming | G01N 3/00 73/620 |
| 8,110,774 B2* | 2/2012 | Huonker | B23K 26/244 219/121.64 |
| 8,145,429 B2* | 3/2012 | DiFoggio | E21B 49/087 73/152.28 |
| 8,146,429 B2* | 4/2012 | Ume | G01N 29/4481 73/622 |
| 8,544,714 B1* | 10/2013 | Obaditch | B23K 20/123 228/2.1 |
| 9,468,988 B2* | 10/2016 | Daniel | B23K 9/0953 |
| 10,029,334 B2* | 7/2018 | Kim | B23K 31/125 |
| 10,160,606 B2* | 12/2018 | Erceg | B65G 47/96 |
| 2014/0346163 A1 | 11/2014 | Rajagopalan et al. | |

FOREIGN PATENT DOCUMENTS

| | | |
|---|---|---|
| CN | 109839384 | 6/2019 |
| CN | 110044909 | 7/2019 |

* cited by examiner

*Primary Examiner* — Yosef Kassa
(74) *Attorney, Agent, or Firm* — Burris Law, PLLC

(57) ABSTRACT

A method of inspecting an electric motor includes scanning an electric motor stator winding with a 2D or 3D camera, acquiring one or more images of a plurality welds between adjacent electrical wires forming the stator winding using the 2D camera, analyzing the one or more acquired images with at least one neural network such that the neural network determines if at least one of the plurality of welds has a weld defect. The at least one neural network is trained and distinguishes between surface discoloration on a surface of the welds and defect discoloration resulting from contamination during welding. Also, the method inspects over 150 welds per electric motor stator winding moving along an assembly line.

19 Claims, 4 Drawing Sheets

AUTOMATED INSPECTION AND VERIFICATION OF ELECTRIC MOTOR WELD QUALITY

FIELD

The present disclosure relates to verifying weld quality and particularly to verifying weld quality of electric motor stator windings.

BACKGROUND

The statements in this section merely provide background information related to the present disclosure and may not constitute prior art.

Weld quality is commonly assessed via manual visual inspection that takes into account and considers visual aspects or information of a surface of a weld. Such information includes whether or not weld defects such as cracks, voids and contamination discoloration are present on the surface of a weld.

Weld inspection in assembly line manufacturing is often taken on an audit basis due to the large number of welds used to fabricate complex parts or components. Accordingly, manual and audit based inspection of such components is not particularly effective since each weld is needed for desired electricity flow and the time needed to inspect each weld can be undesirable. In the alternative, cameras can be used to gather surface data which can be used to assess weld quality. However, traditional image processing methods are ineffective in assessing quality due to surface appearance variations for or between acceptable welds. For example, traditional image processing tools result in a high number of false detections, both accepting defective welds and rejecting good welds.

The present disclosure addresses the issues of inspecting large numbers of welds during assembly line manufacturing among other issues related to inspecting welds used for the manufacture of electric motors stators.

SUMMARY

This section provides a general summary of the disclosure and is not a comprehensive disclosure of its full scope or all of its features.

In one form of the present disclosure, a method of inspecting an electric motor includes scanning an electric motor stator with a stator winding with a camera, acquiring one or more images of a plurality of welds between adjacent electrical wires forming the stator winding using the camera, analyzing the one or more acquired images with at least one neural network such that the neural network determines if at least one of the plurality of welds has a weld defect.

In some variations, the camera is a 2D area camera. In other variations the camera is a 2D line scan camera.

In at least one variation the method further includes transporting the electric motor stator across a field of view of the camera such that a 2D camera scans and acquires the images of the plurality welds as the electric motor stator moves relative to the 2D camera. For example, in some variations the electric motor stator is transported across the field of view of the 2D camera with a conveyor.

In some variations, the method further includes transporting a plurality of electric motors across a field of view of a 2D camera, scanning and acquiring images of the plurality welds between adjacent electrical wires for each of the plurality of electric motors, analyzing each of the acquired images with the at least one neural network, and determining and distinguishing between surface discoloration and defect discoloration for each of the plurality of welds for each of the plurality of electric motors. In such variations, the plurality of welds for each of the plurality of electric motors is more than 100 welds.

In some variations the adjacent electrical wires for each of the plurality of electric motors is laser welded to form the plurality of welds. And in at least one variation the neural network identifies weld defects in the form of voids, pits, cracks, weld size too small, weld size too large, and contamination.

In some variations, the method includes scanning and acquiring an image of at least one weld between an electrical wire and a connector using a 2D camera, analyzing the acquired the image with the at least one neural network, and determining and distinguishing between surface discoloration and defect discoloration for the weld.

In at least one variation, the adjacent electrical wires include adjacent hairpin wire segments. In such variations the adjacent hairpin segments are polymer coated with de-coated ends. Also, in some variations at least one neural network determines if any of the plurality of welds have an enamel contamination weld defect.

In at least one variation the method includes generating a report and an alert when a weld defect is determined for at least one of the plurality of welds, wherein the report comprises a location of the weld defect on the stator winding.

In another form of the present disclosure, a method of automatically inspecting a plurality of electric motors on an assembly line includes transporting electric motor stators on a conveyor through an inspection station comprising a 2D camera. Each of the electric motor stators has a stator winding formed from a plurality of hairpin wire segments joined together with a plurality of welds, scanning and acquiring images of the plurality welds with the 2D camera, and analyzing the acquired images with at least one neural network configured to determine and distinguish between surface discoloration and weld defects on a surface of a weld. In some variations, the method includes generating an alert when a weld defect is determined for at least one of the plurality of welds.

In at least one variation the method identifies weld defects in the form of voids, pits, cracks, weld size too small, weld size too large, and enamel contamination. In some variations, the alert includes an identification a weld defect type and a location of the weld defect on the stator winding.

In still another form of the present disclosure, a method of automatically inspecting a plurality of electric motors on an assembly line includes transporting electric motor stators on a conveyor through an inspection station across a field of view of a 2D camera, wherein each of the electric motor stators has a plurality of hairpin wire segments with a plurality of welds joining adjacent hairpin wire segments, scanning and acquiring images of the plurality welds using the 2D camera, and analyzing the acquired images with at least one neural network configured to determine and distinguish between surface discoloration and weld defects on a surface of a weld. The method includes determining via the at least one neural network if any of the plurality of welds have a weld defect generating an alert when a weld defect is determined on at least one of the plurality of welds, and generating an identification for each of the plurality of welds having a weld defect. In some variations, the method includes training the at least one neural network with an identified defect.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
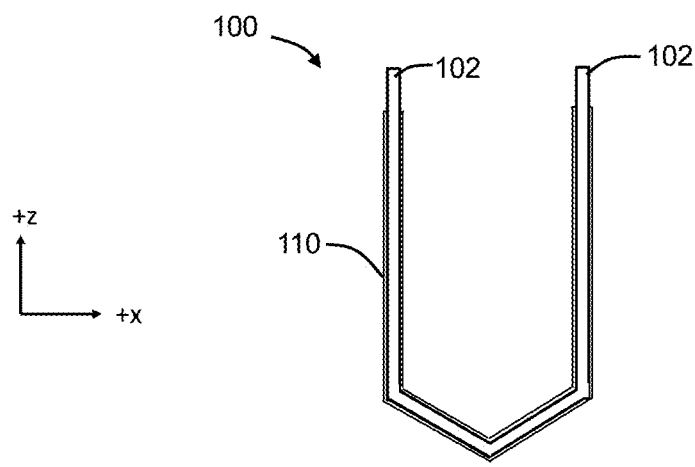
FIG. 1 shows an electrical wire in the form of a hairpin wire segment used for the manufacture of electric motor stator windings according the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
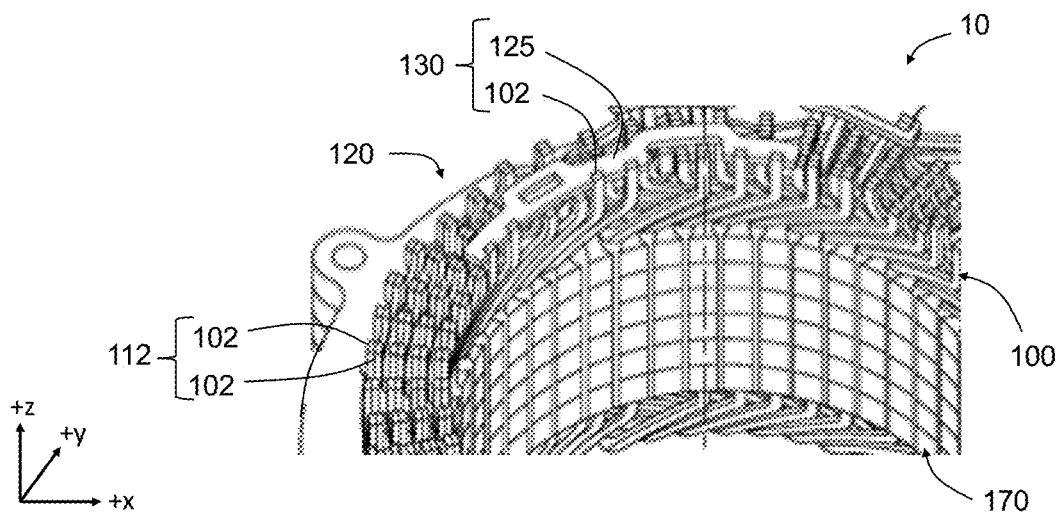
FIG. 2 is a perspective view of a plurality of hairpin wire segments before being welded together to form a stator winding according the teachings of the present disclosure.

Referring to FIGS. 1 and 2, a hairpin wire segment 100 (referred to herein simply as "hairpin wire" or "hairpin wires") is shown in FIG. 1 and a portion of an electric motor stator 10 (referred to herein simply as "stator 10") is shown in FIG. 2. The stator 10 includes a stator winding 120 and a stator core 170. The stator winding 120 is formed from a plurality of hairpin wires 100 electrically connected (e.g., welded) to each other and electrically connected to connectors 125 (shown without welds in FIG. 2). The hairpin wires are made from copper or a copper alloys and the stator core 170 is made from a metal or alloy such as steel. Each of the hairpin wires 100 is bent or formed in a desired shape after insertion into and through the stator core 170 and have a protective enamel coating 110 (e.g., a multi-layer PA-PIA, PEEK, or other polymer coating) to electrically insulate the hairpin wires 100 from the stator core 170. Also, the protective enamel coating 110 is removed from or not present at ends 102 of the hairpin wires 100 (i.e., the ends 102 are "de-coated") and hairpin wire pairs 112 or hairpin wire-connector pairs 130 are joined (e.g., welded) together to form a desired stator winding and for an electric motor.

The hairpin wire pairs 112 and the hairpin wire-connector pairs 130 are typically welded (e.g., laser welded) together to provide connections (i.e., welds) with low electrical resistivity, desired static strength, resistance to fatigue stresses (both vibrational and thermal) and consistent, low discontinuity metallurgical properties. Also, each stator winding includes over 150 hairpin wire pairs 112 and each weld between adjacent hairpin wires 100 provides an electrical conduit or pathway for the stator 10.

Figure 3:
FIG. 3 is an image of a plurality of hairpin wire segments after being welded together to form a stator winding according the teachings of the present disclosure.
Figure 4A:
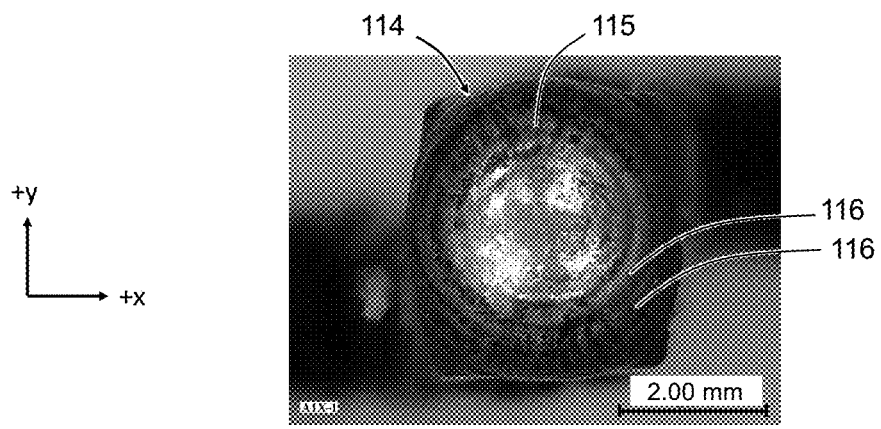
FIG. 4A is an image of an acceptable weld joining a pair of hairpin segments together.
Figure 4B:
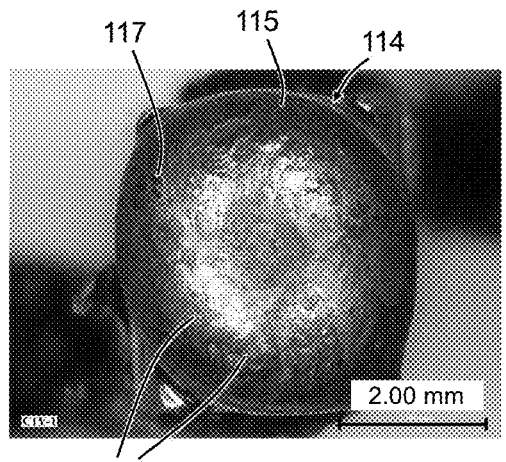
FIG. 4B is an image of a weld joining a pair of hairpin wire segments together with contamination on a surface of the weld.
Figure 4C:
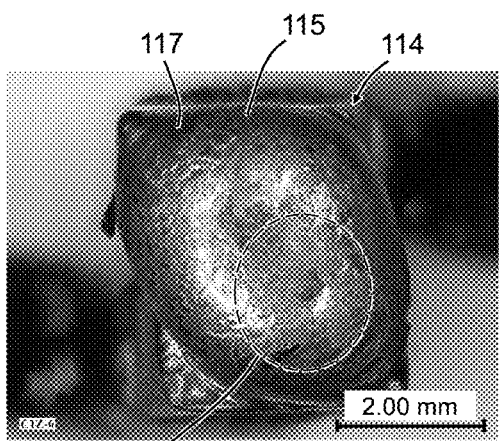
FIG. 4C is an image of a weld joining a pair of hairpin segments together with burnt enamel on a surface of the weld.

A top view of a plurality of welds 114 between adjacent hairpin wires 100 is shown in FIG. 3 and enlarged top views of five different examples of the welds 114 are shown in FIGS. 4A-4E. The weld shown in FIG. 4A is an example of a good or "pass" weld. A surface 115 of the weld 114 in FIG. 4A has some variation in color, however there are no pits or cracks, the surface has a generally round shape (from the top view) with a diameter of about 3.7 millimeters (mm), and the surface 115 does not have any black or brown discoloration (referred to herein as "defect discoloration") that is characteristic of contamination and/or burnt enamel coating. Also, the generally uniform and smooth rings 116 indicate uniform cooling of the surface 115 during solidification.

In contrast the welds shown in FIGS. 4B-4E are examples of "no-pass" welds. For example, the weld 114 in FIG. 4B has defect discoloration spots 117 indicating contamination of the weld 114 occurred during welding, and which may or may not result in reduced performance (e.g., electrical conductivity) of the weld 114 and thus the stator winding 120. The weld 114 in FIG. 4C has a generally oblong shape indicating non-uniform heating and melting of the ends 102 during welding. The surface 115 also has a significant amount of defect discoloration 117 indicating contamination of weld 114 occurred during welding. In fact, the combination of the oblong shape and defect discoloration shown in FIG. 4C indicates the protective enamel coating 110 was burned during welding of the ends 102 and the weld 114 has burnt enamel contamination.

Figure 4D:
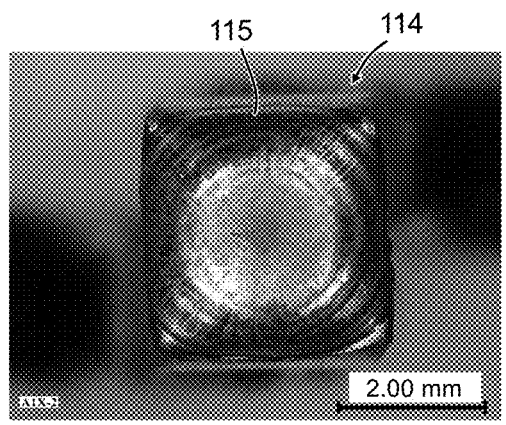
FIG. 4D is an image a weld joining a pair of hairpin segments together with a weld size that is less than desired.
Figure 4E:
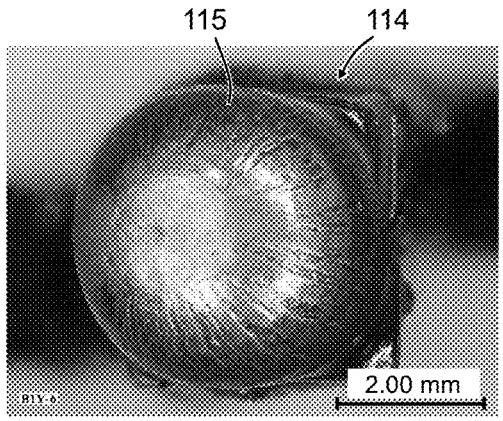
FIG. 4E is an image a weld joining a pair of hairpin segments together with a weld size that is greater than desired.

The weld 114 in FIG. 4D has a generally square or rectangular shape with an outer dimension of about 3.2 mm, thereby indicating that less than desired heating and melting of the ends 102 occurred during welding. That is, the weld 114 in FIG. 4D is "too small." The weld 114 in FIG. 4E has an outer dimension of about 4.3 mm, thereby indicating that more than desired heating and melting of the ends 102 occurred during welding. That is, the weld in 114 in FIG. 4E is "too large."

Figure 5:
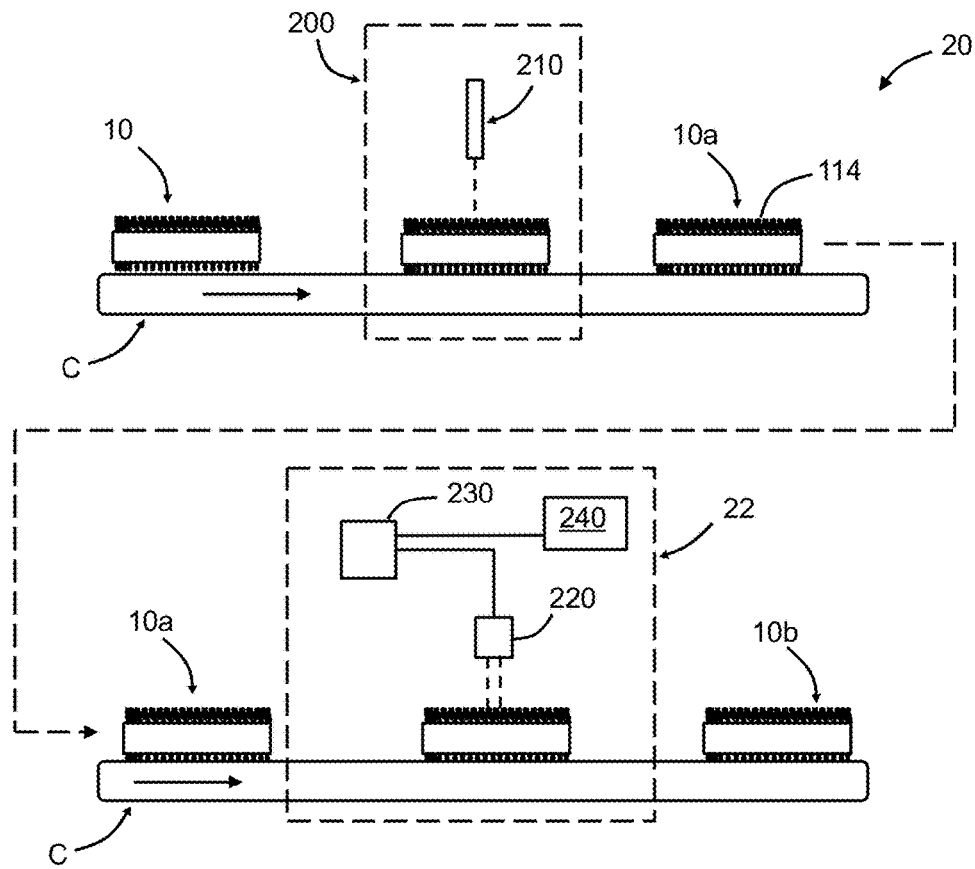
FIG. 5 shows an assembly line for manufacturing electric motor stators with a weld inspection station according to the teachings of the present disclosure.

Referring now to FIG. 5, an electric motor stator welding line 20 (also referred to herein simply as "welding line 20") with a weld inspection station 22 is shown. The welding line 20 includes a conveyor 'C' configured to transport stators 10 into and out of a welding station 200, although the stators 10 can be transported into and out of the welding station using other types of transport mechanisms or devices, including manual and/or robotic transport of the stators 10. The welding station 200 includes a welder 210 (e.g., a laser welder) configured to weld the hairpin wire pairs 112 and hairpin wire-connector pairs 130 shown in FIG. 2 and form a welded stator 10a. After forming a plurality of welds 114 on the hairpin wire pairs 112 and the hairpin wire-connector pairs 130, the conveyor C transports each of the welded stators 10a to the weld inspection station 22 where the plurality of welds 114 are automatically inspected using an electronic imaging device 220 (referred to herein as "camera 220") and a control system 230. Non-limiting examples of the camera 220 include 2D cameras such as a 2D area camera, a 2D line scan camera, among others, and 3D cameras such as a 3D laser scanner, a 3D area camera, among others. In some variations the results of the automated inspection are displayed on a display screen 240. And after leaving the weld inspection station 22, an inspected stator 10b is removed from the weld inspection station 22 for further processing.

Figure 6:
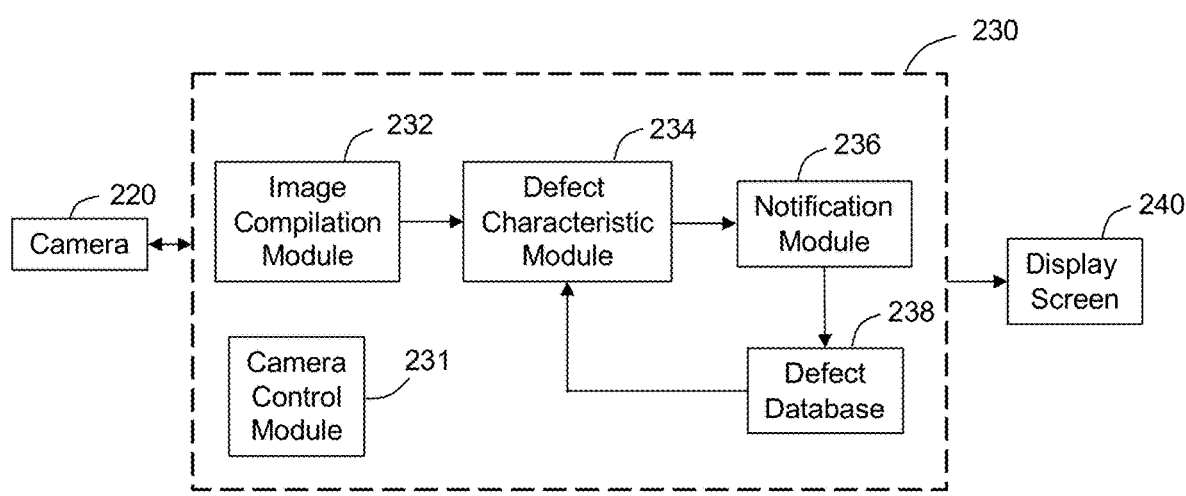
FIG. 6 is a block diagram for the weld inspection station in FIG. 5.

Referring to FIG. 6 a block diagram of the camera 220, the control system 230 and the display screen 240 is shown. The control system 230 includes a camera control module 231 configured to command the camera 220 to acquire one or more images of the plurality of welds 114 for each of the welded stators 10a entering the weld inspection station 22. In some variations the camera control module 231 is configured to command or set a camera angle, a focus, and a zoom for the camera 220. In at least one variation, the camera control module 231 is configured to command the camera 220 to acquire a series of images of the welds 114 as each stator 10a moves past and within a field of view (e.g., scanning area) of the camera 220 such that the camera 220 scans and acquires the images of the plurality of welds 114 as the motor stator 10a moves relative to the camera 220. In variations where the camera 220 is a 2D line scan camera or a 3D laser scanner, an image compilation module 232 compiles the series of images into one or more compiled images that are analyzed by a defect characteristic module 234.

The defect characteristic module 234 is configured to detect or identify defects on a surface of the welds 114. As described above with respect to FIGS. 4A-4E, the defect characteristic module 234 is configured to identify characteristics (e.g., visual characteristics) of the welds 114 such as defect discoloration on a surface of each of the welds 114, a size of the each of the welds 114, a shape of each of the welds 114, voids or pits on a surface of each of the welds 114, and stringers or valleys on a surface of the each of the welds 114, among others. In some variations the defect characteristic module 234 is configured to provide a score (e.g., a number from 1 to 10) for each type of identified defect on the surface of each of the welds 114 based on the severity or amount of each defect on the surface. Non-limiting examples of severity or amount of each defect include percentage of surface area having defect discoloration (e.g., determined via a pixel color comparison), size of a weld 114 relative to a predefined size or predefined size range, number of pits, size of a pit, number of cracks, size of a crack, number of stringers or valleys, and size of a stringer or valley, among others. In at least one variation the defect characteristic module 234 determines or tabulates an overall score for each weld 114 based on the score of each identified defect. And in such a variation the defect characteristic module 234 can transmit the overall score to a notification module 236.

In some variations the defect characteristic module 234 is trained to identify the defects on a surface of a weld 114. And in at least one variation the defect characteristic module 234 is continuously trained to identify defects on a surface of a weld 114. In such variations the defect characteristic module 234 includes a neural network with a plurality of input units, hidden units, and output units. And in at least one variation the neural network is a feedforward network trained via backpropagation. For example, and with reference to FIGS. 4A-4C, each of the images have surface discoloration. However, the contrast (in color) of the surface discoloration in the image shown in FIG. 4A is less than the defect discoloration in the images shown in FIGS. 4B-4C. Accordingly, in some variations of the present disclosure the defect characteristic module 234 is trained to distinguish between discoloration present on a surface of "pass" welds 114 (e.g., FIG. 4A) from contamination discoloration (i.e., defect discoloration) present on a surface of "no-pass" welds 114 (e.g., FIGS. 4B-4C).

When included, the notification module 236 is configured to generate a report based on an overall score determined by the defect characteristic module 234. In some variations the report and/or some version of the report is transmitted and displayed on the display screen 240 such that it can be viewed by an operator. Non-limiting examples of information included in report and/or some version of the report displayed on the display screen 240 include number of "pass" welds, number of "no-pass" welds, number of "need further inspection" welds, type(s) of defect(s) detected or identified, location of defect(s) on the stator winding, an image of identified defect(s), a partial image of the stator winding welds 114, an image of all the stator winding welds 114, and an image of a welded stator 10a showing one or more locations where one or more defects have been identified, among others.

In some variations the notification module 236 provides a list of identified defects to a defect database 238 such that the defect database 238 is updated. In addition, in at least one variation the updated defect database 238 is used to further train the defect characteristic module 234.

Figure 7:
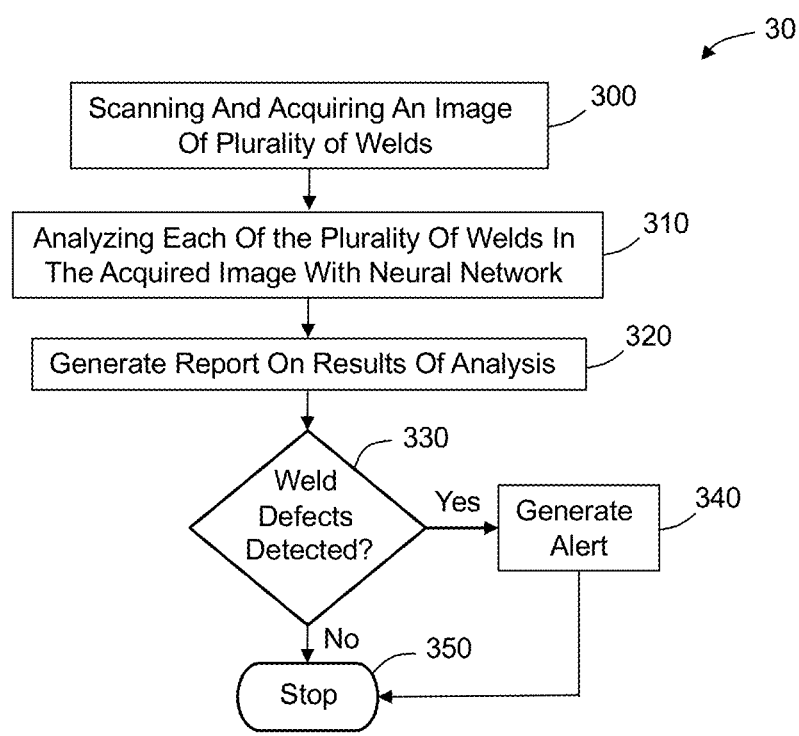
FIG. 7 is a flow chart for a method of weld inspection according to the teachings of the present disclosure.

Referring to FIG. 7, a flow chart of a method 30 for automatically verifying electric motor weld quality is shown. In some variations the method 30 uses the control system 230 to automatically verify electric motor weld quality. The method 30 includes scanning and acquiring an image of a plurality of welds of an electric motor stator winding at 300 and analyzing each of the welds in the acquired image using a neural network at 310. The method 30 generates a report of the analysis results at 320 and determines whether or not the report indicates one or more defects were identified from the acquired image at 330. In the event that one or more defects are identified, the method 30 generates an alert at 340 and then stops at 350. In the alternative, i.e., no defects are identified, the method 30 stops at 350. It should be understood that the method 30, and other methods disclosed herein, can be used repeatably to verify electric motor weld quality for a plurality of stator windings on an assembly line and/or during assembly line manufacture of electric motors. In addition, it should be understood that the method 30 inspects over 150 welds per electric motor stator winding moving along an assembly line.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the terms "module", "control system", and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality, such as, but not limited to, movement drivers and systems, transceivers, routers, input/output interface hardware, among others; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A method of inspecting an electric motor, the method comprising:
   scanning an electric motor stator with a stator winding with a camera;
   acquiring images of a plurality of welds between adjacent electrical wires forming the stator winding using the camera; and
   analyzing the acquired images with at least one neural network, wherein the neural network determines if at least one of the plurality of welds has one of a weld defect, a surface discoloration, and a defect discoloration.

2. The method according to claim 1, wherein the camera is a 2D area camera.

3. The method according to claim 1, wherein the camera is a 2D line scan camera.

4. The method according to claim 1 further comprising transporting the electric motor stator across a scanning area of the camera such that a 2D camera scans and acquires the images of the plurality of welds as the electric motor stator moves relative to the 2D camera.

5. The method according to claim 4, wherein the electric motor stator is transported across the scanning area of the 2D camera with a conveyor.

6. The method according to claim 1 further comprising:
   transporting a plurality of electric motors across a scanning area of a 2D camera;
   scanning and acquiring images of the plurality welds between adjacent electrical wires for each of the plurality of electric motors;
   analyzing each of the acquired images with the at least one neural network; and
   determining and distinguishing between surface discoloration and weld defects for each of the plurality of welds for each of the plurality of electric motors.

7. The method according to claim 6, wherein the plurality of welds for each of the plurality of electric motors is more than 100 welds.

8. The method according to claim 7, wherein each of the adjacent electrical wires for each of the plurality of electric motors is laser welded to form the plurality of welds.

9. The method according to claim 1, wherein the weld defects comprise at least one of voids, pits, cracks, weld size too small, weld size too large, and enamel contamination.

10. The method according to claim 1 further comprising:
    scanning and acquiring an image of at least one weld between an electrical wire and a connector using a 2D camera;
    analyzing the acquired the image with the at least one neural network; and
    determining and distinguishing between surface discoloration and weld defects for the weld.

11. The method according to claim 1, wherein the adjacent electrical wires comprise adjacent hairpin segments.

12. The method according to claim 11, wherein the adjacent hairpin segments are polymer coated with de-coated ends.

13. The method according to claim 12, wherein the at least one neural network determines if any of the plurality of welds have a polymer contamination weld defect.

14. The method according to claim 1 further comprising generating an alert and an identification when a weld defect is determined for at least one of the plurality of welds, wherein the identification comprises a position of the weld defect on the stator winding.

15. A method of automatically inspecting a plurality of electric motors on an assembly line, the method comprising:
    transporting electric motor stators on a conveyor through an inspection station comprising a 2D camera, wherein each of the electric motor stators has a stator winding formed from a plurality of hairpin wire segments joined together with a plurality of welds;
    scanning and acquiring images of the plurality welds with the 2D camera;

analyzing the acquired images with at least one neural network configured to determine and distinguish between surface discoloration and weld defects on a surface of a weld; and generating an alert when a weld defect is determined for at least one of the plurality of welds.

16. The method according to claim 15, wherein the weld defects are selected from the group consisting of voids, pits, cracks, weld size too small, weld size too large, and enamel contamination.

17. The method according to claim 15, wherein the alert comprises an identification of a weld defect type and a position of the weld defect on the stator winding.

18. A method of automatically inspecting a plurality of electric motors on an assembly line, the method comprising:

transporting electric motor stators on a conveyor through an inspection station across a scanning area of a 2D camera, wherein each of the electric motor stators has a plurality of hairpin wire segments with a plurality of welds joining adjacent hairpin wire segments;

scanning and acquiring images of the plurality of welds using the 2D camera; and analyzing the acquired images with at least one neural network configured to determine and distinguish between surface discoloration and weld defects on a surface of a weld;

determining via the at least one neural network if any of the plurality of welds have a weld defect;

generating an alert when a weld defect is identified on at least one of the plurality of welds; and generating an identification for each of the plurality of welds having the weld defect.

19. The method according to claim 18 further comprising training the at least one neural network with an identified weld defect.

* * * * *